(12) United States Patent
Tang et al.

(10) Patent No.: US 7,826,365 B2
(45) Date of Patent: Nov. 2, 2010

(54) METHOD AND APPARATUS FOR RESOURCE ALLOCATION FOR STREAM DATA PROCESSING

(75) Inventors: Ao (Kevin) Tang, Pasadena, CA (US); Zhen Liu, Tarrytown, NY (US); Honghui (Cathy) Xia, Briarcliff Manor, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1063 days.

(21) Appl. No.: 11/519,764

(22) Filed: Sep. 12, 2006

(65) Prior Publication Data

US 2008/0062886 A1    Mar. 13, 2008

(51) Int. Cl.
*H04L 1/00*    (2006.01)
(52) U.S. Cl. .................... 370/235; 370/468; 709/226; 709/252
(58) Field of Classification Search ......... 370/229–235, 370/252–256, 468; 709/252, 223–226
See application file for complete search history.

(56) References Cited

U.S. PATENT DOCUMENTS 6,865,185 B1 *   3/2005   Patel et al. .................. 370/412
6,937,770 B1 *   8/2005   Oguz et al. ............... 375/240.2
7,602,710 B2 * 10/2009   Grippo et al. ............... 370/235
2004/0081091 A1 * 4/2004   Widmer et al. .............. 370/254

OTHER PUBLICATIONS

A.V. Goldberg, E. Tardos, and R.E. Tarjan, "Network Flow Algorithms," Tech. Report, Department of Computer Science, Stanford University, Stanford, 1989.
François Baccelli, Inria, Valbonne, France and Zhen Liu, CNET PAA-ATR, Issy Les Moulineaux, France, "On the Execution of Parallel Programs on Multiprocessor Systems—A Queuing Theory Approach," Journal of the ACM, vol. 37, No. 2, Apr. 1990, pp. 373-417.

* cited by examiner

*Primary Examiner*—Ricky Ngo
*Assistant Examiner*—Pao Sinkantarakorn
(74) *Attorney, Agent, or Firm*—F. Chau & Associates, LLC

(57) ABSTRACT

Resource allocations in stream data processing systems are performed to allocate the resources in a cost-effective manner by formulating the resource allocation problem as a linear program. For a problem with a single output, a backward algorithm or method is used that produces an optimal solution in linear time. For a problem with multiple outputs and the network has a tree structure, a backward shrink algorithm or method is used to provide an optimal solution in linear time. These algorithms are fully distributed, they require only local exchange of parameters between neighboring nodes, and are adaptive to the dynamic changes in network conditions and flow rate fluctuations.

8 Claims, 12 Drawing Sheets

METHOD AND APPARATUS FOR RESOURCE ALLOCATION FOR STREAM DATA PROCESSING

This invention was made with Government support under Contract No.: H98230-04-3-0001 awarded by the U.S. Dept. of Defense. The Government has certain rights in this invention.

BACKGROUND OF THE INVENTION

This disclosure relates to an adaptive resource allocation solution for allocating resources in continuous stream data processing.

A modern stream data processing environment is quite complex. There are requirements to process, store, maintain and retrieve large volumes of mostly real-time data at high rates. The real-time data is referred to as continuous stream data. These requirements pose difficult design challenges for efficient stream processing systems.

Efficient stream processing systems have useful applications in large-scale reconnaissance, surveillance, environmental conditions monitoring, anomaly detection, and catastrophe control, for example. In these exemplary applications, the analysis usually must be done on-the-fly, with a low tolerance for delay.

There is therefore a need to find the most efficient way to allocate limited resources and to use such resources efficiently, so as to carry on the real-time processing.

In stream data processing environments, typically multiple data streams flow into the system and are processed to produce the desired valuable output. Examples of the processings that can be performed are matching, aggregation, summarization and the like. Typically, these processings can consist of several levels of interconnected tasks, such as represented in FIG. 1.

From FIG. 1 it is then seen that there is a requirement to determine the best resource allocation method from among the various processing tasks to optimize the overall performance. The presently known approaches only consider very simplistic models and provide ad hoc heuristics.

SUMMARY OF THE INVENTION

According to an exemplary embodiment of the present invention, an analysis is made of the tradeoff between resource consumptions and output benefits in order to allocate the resources in the most cost-effective way. In an exemplary embodiment of the present invention, the resource allocation problem is treated as a linear program. In a resource allocation situation that has a single output, an exemplary embodiment of the present invention employs a backward algorithm that produces the optimal solution in linear time. On the other hand, for the resource allocation situation that has multiple outputs and where the network has a tree structure, a backward shrink algorithm is provided that provides the optimal solution in linear time.

In the case of a general network topology with multiple outputs, an exemplary embodiment of the present invention provides a decomposition procedure that reduces the original problem to an equivalent problem with a task graph of a tree structure.

In addition, a polynomial time algorithm is provided to find the optimal solution for the resource allocation problem.

These algorithms are fully distributed, they require only local exchange of parameters between neighboring nodes, and are adaptive to the dynamic changes in network conditions and flow rate fluctuations. They achieve optimal or near-optimal performance since they are designed based on the properties from the global optimal solutions.

The manner in which the above objects and advantages are provided by exemplary embodiments of the present invention will become clear from the following detailed descriptions of the exemplary embodiments, when taken with the accompanying drawings.

DETAILED DESCRIPTION OF EXEMPLARY EMBODIMENTS

Figure 1:
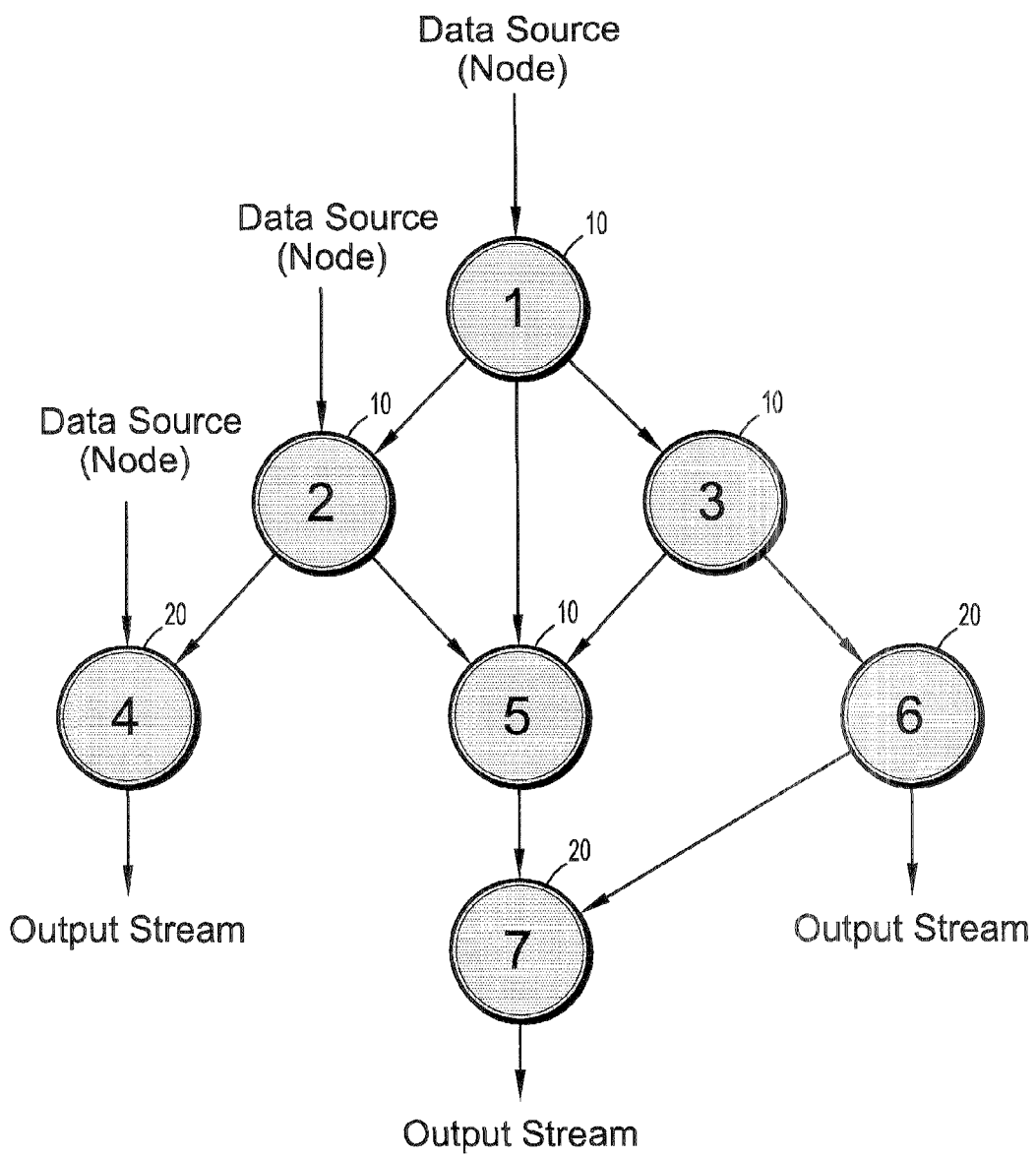
FIG. 1 is a representation of conventional processing consisting of several levels of tasks.

Returning to FIG. 1 a more detailed explanation of the general model is presented.

In a stream data processing system, incoming data flow continuously from several sources. This data needs to go through several levels of processing, such as selection, filtering, or combining, to generate the expected output. A directed acyclic diagram, referred to as a stream processing diagram, is used in FIG. 1 to describe the producer-consumer relationship among processing units associated with the streams. There are source nodes, sink nodes, and processing nodes shown in FIG. 1, where directed edges represent the information flow between various nodes. The source nodes correspond to the source of the input data streams. These nodes only have edges going out, and do not have any edges between them. By edges is meant that there are means for connecting the nodes. The sink nodes 10 correspond to the receivers of the eventual processed information. These nodes only have edges going to them, and do not have any edges in between. Processing nodes stand for processing units 20. A processing unit may require inputs from multiple data streams simultaneously and produce one or many valuable output streams. Such a diagram can be plotted in a way so that all the directed edges are pointing downward. We can now view the system as information coming from the top and passing through the processing units 20 in the middle and eventually leading to the output streams at the bottom, see FIG. 1.

In the quantitative relationship between the input, output and resource consumption, each processing unit 20 processes data flows from its upstream nodes simultaneously at a given proportion and generates output flows to its downstream nodes at a possibly different proportion.

It is assumed that there are a total of R units of CPU resource available. An exemplary embodiment of the present invention finds optimal or approximate solutions of allocating the resource among all the processing units to maximize the total value of return generated by the system. Distributed solutions capable of adapting to local changes in the consumption and production rates are provided. There are many different metrics to measure the value of return, for example, throughput, loss, and delay. The metric considered in this exemplary embodiment is the weighted sum of the throughputs, where the weights are, for example, based on the importance of the throughputs of the output streams.

It should be understood that these R units of CPU resource may reside on multiple physical servers, in which case the processing units can be assigned to different servers. Thus, this exemplary embodiment involves the "continuous optimization" problem where the central pool of CPU resource can be arbitrarily partitioned. For the "discrete optimization" problem, which includes both process assignment and server resource allocation, one way to solve the problem is to combine the "continuous optimization" solution with a "bin packing" approach by packing the processing units into bins representing physical servers.

An exemplary embodiment of the present invention provides a solution when there is only one final output stream of interest. In other words, $\mathcal{O}=\{O\}$ is a singleton, where O is the only sink node. Denote the task graph $G=(N, E)$, where N is the set of all tasks, and E the set of edges representing the information flow in between the tasks. Without loss of generality, node N is denoted to be the last processing node reaching O, since there is exactly one edge leading to each sink node. In this case, an exemplary embodiment of the present invention can provide a simple backward algorithm to solve the problem.

In order for node O to receive an output at rate $\beta_O^k$, node k must produce an output stream at a rate $\beta_O^k$, for which node k requires at least one unit of resource and inputs at rate $\alpha_i^k$ from all its predecessor nodes i.

For each predecessor node i, in order to provide the output to node k at the requested rate $\alpha_i^k x_k$, (with $x_k=1$), the minimum amount of resource required at node i is $$x_i = \frac{\alpha_i^k x_k}{\beta_k^i}.$$

Furthermore, node i requires inputs at rate $\alpha_j^i$ from all its predecessor nodes. If node i is the parent of both nodes j and j', then i needs to meet the input requirements of both j and j'. Hence, the minimum amount of resource required at node i is:

$$x_i = \max\{j : (i, j) \in E\} \frac{\alpha_j^i x_j}{\beta_j^i}.$$

The above procedure is repeated until the top of the diagram is reached, where all nodes are source nodes. The resulting resource requirement at each node is P, and the input rates from all source nodes in I are the minimum requirements in order for sink node O to receive the output at rate $\beta_O^k$.

In the following, the algorithms and methods described above are generalized to address the cases with multiple output nodes, that is, |O|>1. In this setting, there is a decision between generating an output for one stream versus generating an output for another stream, or both. This kind of trade-off is somewhat difficult to evaluate due to the simultaneous flow consumption and output. Nevertheless, first the algorithms to treat certain simpler cases are derived, and then the solution is extended to address the general cases.

More specifically, the case where the task graph G is a tree is now explained. That is, there is a single external input stream at the root node, and all tasks have just outgoing edges. We start with the basic case in the following example in FIG. 2, which shows a 3-node binary tree.

Figure 2:
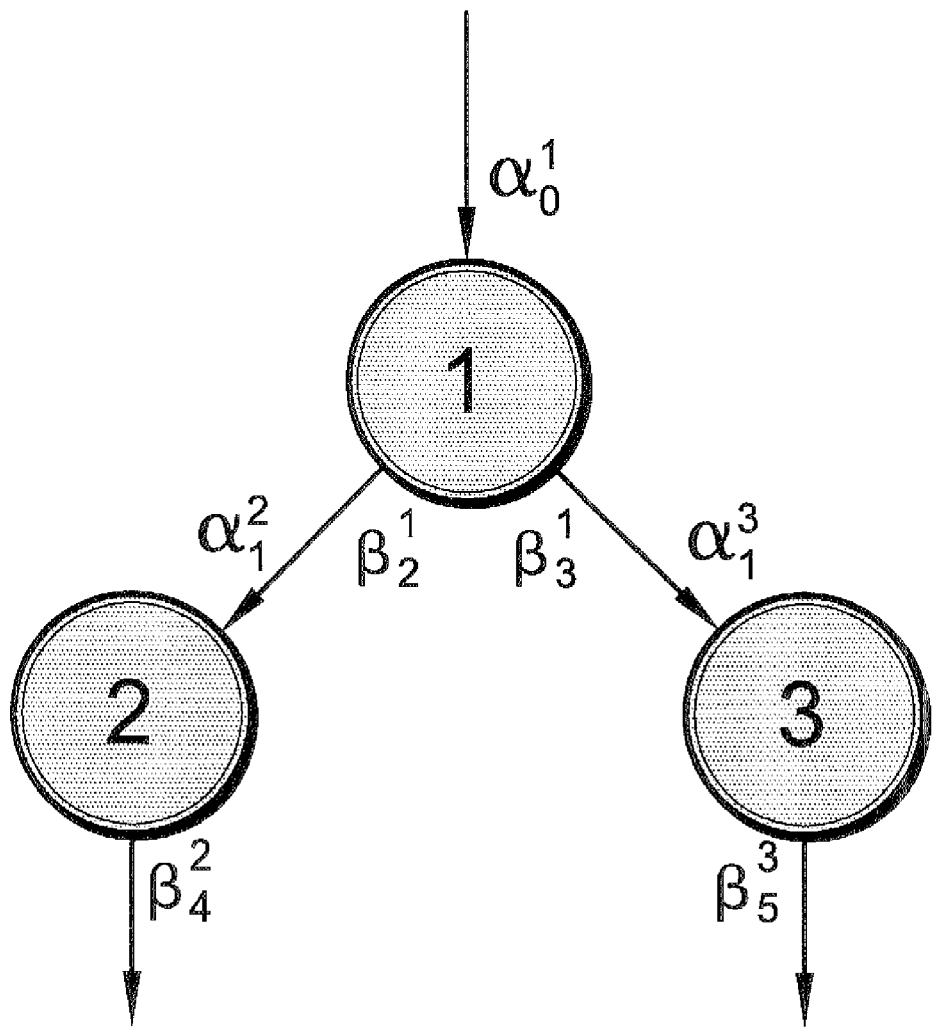
FIG. 2 is a representation of a 3-node binary tree solved by linear programming according to an exemplary embodiment of the present invention.

Consider the basic problem where one wants to allocate a total resource R to the 3 tasks (represented by the 3 nodes) in the binary tree as shown in FIG. 2. Assume the weights are $w_4$ and $w_5$, maximum allowed external input rate is $\lambda_0$. Let $x_1, x_2, x_3$ be the decision variables denoting the amount of resources that should be allocated to tasks 1, 2, and 3, respectively. The problem can be formulated as the following linear program.

$$\begin{aligned}
\max \quad & w_4 \beta_4^2 x_2 + w_5 \beta_5^3 x_3 \\
\text{s.t.} \quad & x_1 + x_2 + x_3 \le R \\
& \alpha_0^1 x_1 \le \lambda_0 \\
& \alpha_1^2 x_2 \le \beta_2^1 x_1 \\
& \alpha_1^3 x_3 \le \beta_3^1 x_1 \\
& x_1 \ge 0, x_2 \ge 0, x_3 \ge 0.
\end{aligned}$$

Figure 3:
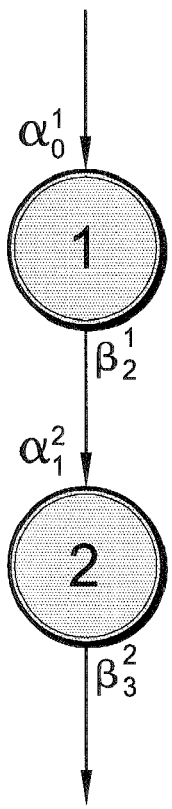
FIG. 3 is a representation of an equivalent 2-node representation of the system of FIG. 2 according to an exemplary embodiment of the present invention.

The 3-node binary tree can be reduced to an equivalent single node by aggregating the resource consumption of the two leaf nodes and change the parameters accordingly as follows.

i) If $\dfrac{w_4 \beta_4^2 \beta_2^1}{\alpha_1^2 + \beta_2^1} > w_5 \beta_5^3$, then, $\hat{\alpha}_0^1 = \alpha_0^1, \hat{\beta}_2^1 = \beta_2^1, \hat{\alpha}_1^2 = \alpha_1^2, \hat{\beta}_3^2 = \beta_4^2, \hat{w}_3 = w_4.$ -continued ii) If $\frac{w_5 \beta_5^3 \beta_3^1}{\alpha_1^3 + \beta_3^1} > w_4 \beta_4^2$, then, $\hat{\alpha}_0^1 = \alpha_0^1, \hat{\beta}_2^1 = \beta_3^1, \hat{\alpha}_1^2 = \alpha_1^3, \hat{\beta}_4^2 = \beta_5^3, \hat{w}_3 = w_5.$ iii) Else, $\hat{\alpha}_0^1 = \alpha_0^1, \hat{\beta}_2^1 = \beta_2^1 + \beta_3^1; \hat{\alpha}_1^2 = \dfrac{\frac{\alpha_1^2}{\beta_2^1}\alpha_1^3 + \frac{\alpha_1^3}{\beta_3^1}\alpha_1^2}{\frac{\alpha_1^2}{\beta_2^1} + \frac{\alpha_1^3}{\beta_3^1}},$ $\hat{\beta}_3^2 = \dfrac{\frac{\beta_2^1}{\alpha_1^2}\beta_4^2 + \frac{\beta_3^1}{\alpha_1^3}\beta_5^3}{\frac{\beta_2^1}{\alpha_1^2} + \frac{\beta_3^1}{\alpha_1^3}}, \hat{w}_3 = \dfrac{\frac{\beta_2^1}{\alpha_1^2}\beta_4^2 w_4 + \frac{\beta_3^1}{\alpha_1^3}\beta_5^3 w_5}{\frac{\beta_2^1}{\alpha_1^2}\beta_4^2 + \frac{\beta_3^1}{\alpha_1^3}\beta_5^3}.$ Following the above description, the problem in FIG. 2 is equivalent to the simpler model in FIG. 3. FIG. 3 is the equivalent 2-node representation of FIG. 2. The parameter mappings are independent of the parameters $\lambda_0$ and R. This is a key property for the later methods.

After merging the leaf nodes into a single leaf, we also have another basic reduction to reduce two nodes in tandem into a single node. We can further aggregate the model in FIG. 3 into a simpler model as shown in FIG. 4, where the parameters are further adjusted as follows.

Figure 4:
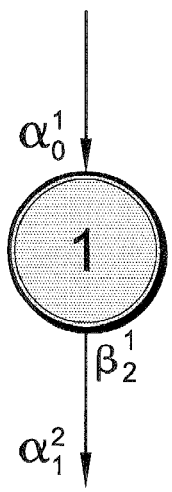
FIG. 4 is a representation of an equivalent 1-node representation of the system of FIG. 2 according to an exemplary embodiment of the present invention.

$\overline{\alpha}_0^1 = \dfrac{\hat{\alpha}_0^1 \hat{\alpha}_1^2}{\hat{\alpha}_1^2 + \hat{\beta}_2^1}; \quad \overline{\beta}_2^1 = \dfrac{\hat{\beta}_3^2 \hat{\beta}_2^1}{\hat{\alpha}_1^2 + \hat{\beta}_2^1};$ $\overline{w}_2 = \hat{w}_3; \quad \overline{x}_1^* = \dfrac{\hat{\alpha}_1^2 + \hat{\beta}_2^1}{\hat{\alpha}_1^2}\tilde{x}_1^*;$ $\overline{x}_1^* = \dfrac{\hat{\alpha}_1^2 + \hat{\beta}_2^1}{\hat{\beta}_2^1}\hat{x}_2^*.$ First consider the mapping from FIG. 3 to FIG. 4. Suppose $(\hat{x}_1^*, \hat{x}_2^*)$ is the optimal solution to FIG. 3. We then obtain $\tilde{x}_1^*$ and show that it is a feasible solution to FIG. 4. For the mapping from FIG. 4 to FIG. 3, we need to check the flow constraint.

Finally, we check that the objective values are the same. Then we can map the optimal solution of one problem to a feasible solution to the other problem and maintain the objective values. Therefore, the mapped solution must be optimal for its corresponding problem.

Besides binary trees, the change from the structure of FIG. 2 to the structure of FIG. 3 can also be applied repeatedly to handle general fork trees with arbitrary out-degree ($\geq 2$). It is straight forward to check formula that the result of the merging process does not depend on the order of the merging process. It is also straight forward to prove a similar process used in solving the problem as shown in FIG. 2. The idea of dealing with the general tree is to apply the basis for the structure shown in FIG. 2 to a unit of a two layer sub-tree and then replace them with a new node. The following states the whole process.

Backward Shrink Algorithm or Method for Trees

1. If there are 2 leaves with a common predecessor, apply the procedure for changing from the structure of FIG. 2 to that of FIG. 3 to these 3 nodes (2 leaves and their predecessor) to find the equivalent 2 node structure. Otherwise, use the procedure used to go from the structure of FIG. 3 to that of FIG. 4 to aggregate 2 nodes (a leaf and its predecessor) to be a single node structure.
2. Repeat the above step 1 until there is only one node left.
3. Set all resources to that node, and map resource allocations back according to either the process used to go from FIG. 2 to FIG. 3 or the process used to go from FIG. 3 to FIG. 4. The method then terminates and yields the optimal solution. It runs in time O(|E|).

Since each round of execution of step 1 above decreases the number of links by 1, the complexity is O(|E|).

Optimality can be proved using induction. When there is only one node, it is clear that the algorithm generates the optimal solution. Suppose the algorithm generates the optimal solution for all the trees with less than K nodes. Now, a tree with K+1 nodes is considered. First, the algorithm is used to generate the solution $x^{\#}$. Suppose the optimal solution to the original solution, $x^*$ is strictly better than $x^{\#}$. Then contradictions are derived. The method or algorithm set forth above, solves a series of simple problems like FIG. 2 and FIG. 3 to merge the leaf nodes all the way up to the root node. One of the last steps in the merging process leaves the diagram with the root and its children only, that is, a fork graph. Each of its children is an aggregation of its descendents. From $x^{\#}$ and $x^*$, the corresponding solutions for this fork diagram can be obtained by aggregation. If the corresponding solutions are the same for this fork diagram, then $x^{\#}$ and $x^*$ must be the same, because of the induction hypothesis. If the corresponding solutions are different, then the results for the fork diagram imply that there can not exist another solution that is strictly better than the solution from the step described above for the backward shrink algorithm for trees Algorithm 2. Therefore, $x^*$ can not be strictly better than $x^{\#}$. A contradiction. Hence, $x^{\#}$ must be an optimal solution. By induction, the method generates an optimal solution for general trees with any number of nodes.

In this section, the general rules that can be applied to aggregate some special sub-diagrams into equivalent supernodes are described. Some general properties of the centralized solutions for the resource allocation problem are first presented.

Assume that the consumption and production rates ($\alpha_i^j$ and $\beta_k^j$) are known constants. Then, the general problem stated above can be formulated as a linear program (LP) problem. First consider a resource allocation policy $x = (x_j, j \in P)$, where $x_j$ is the amount of resource assigned for processing unit j, $j \in P$. Node j, with $x_j$ being the amount of resource, can then process $\alpha_i^j x_j$ amount of flow for each node $i \in I^j$, and generate $\beta_k^j x_j$ amount of flow for each node $k \in O^j$. For such an allocation to be valid, the amount of flow consumed by the downstream nodes cannot be larger than the amount generated by the upstream nodes. This needs to hold for all the edges in the diagram, including the input edges. The overall benefit from the output streams is $\Sigma_{k \in O} \Sigma_{j \in I^k} \omega_k \beta_k^j x_j$. The optimization problem can be formulated as the following linear program.

One can use general linear program solvers to solve the (LP) problem once the parameters are available. This centralized solution, however, requires global information and needs all the processing nodes to act in coordination. It is not dynamic enough to adapt to the possible changing environment, where certain flow properties and system parameters could vary over time. Distributed algorithms, however, require local information and are more adaptive to the changing environment. Distributed algorithms or methods for this resource allocation problem based on the properties from the global optimal solutions are developed below. For this purpose, some key properties of optimal solutions are derived next.

For the ease of presentation, a partial order of the nodes in a diagram $G=(N,\epsilon)$ is presented. For two nodes i and j in N, we say that i<j if there is a directed path (i=$l_1, l_2, \ldots, l_L$=j) that leads node i to node j, where $(l_j, l_{j+1})\in\epsilon$ for j=1, . . . , L−1. It is assumed say that a node is active (resp. idle) in a solution if this node receives nonzero (resp. zero) CPU resource allocation in that solution.

Figure 5:
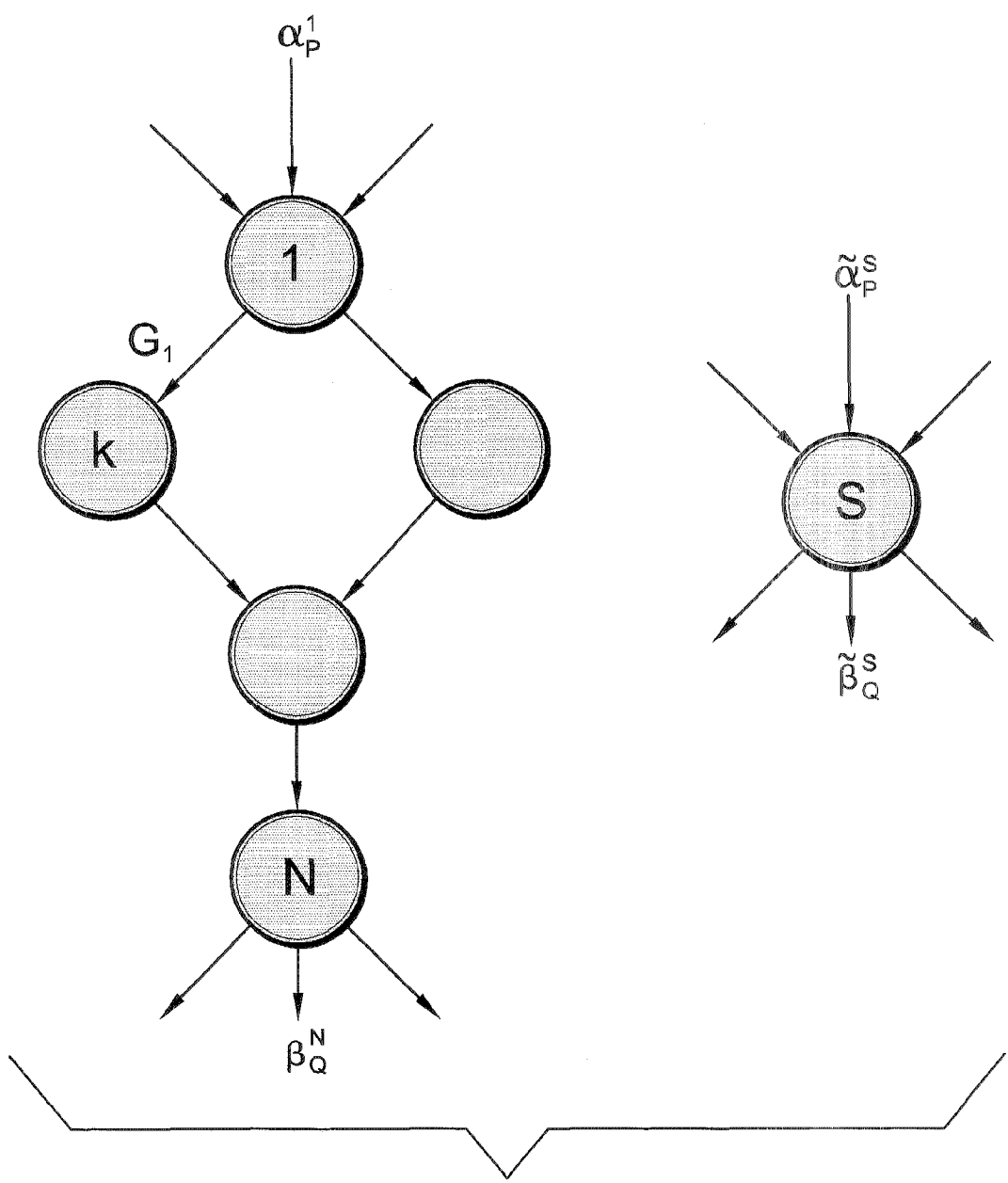
FIG. 5 is a representation of a series-parallel sub-diagram and an equivalent supernode according to an exemplary embodiment of the present invention.

Referring to FIG. 5, it is presumed that a diagram is a two-terminal labeled diagram (G,s,t) with marked head node (terminal) s and tail node (terminal) t, if for any node k∈G, we have i<k<j. The series composition of two-terminal labeled diagrams (G,s,t) and (H,x,y) with t=x is (G∪H,s,y). The parallel composition of (G,s,t) and (H,x,y) with s=x and t=y is (G∪H,s,t). A diagram is a series-parallel if it can be created from single two-terminal labeled edges by series and/or parallel compositions. The left plot in FIG. 5 illustrates one such example where node 1 is the head and node N is the tail.

In the following relating to FIG. 5, the head node will always be labeled as node 1 and the tail node will always be labeled as node N.

Consider a diagram G=(N,E) that has a series-parallel sub-diagram $G_1=(N_1,E_1)$. Denote $G_2=(N_2,E_2):=G\setminus G_1$. Sub-diagram $G_1$ can be aggregated into an equivalent supernode S using the following procedure.

Aggregation Procedure 1: Series-Parallel Graphs (FIG. 5)

Perform the initial steps used in solving the single output problem as shown in FIG. 1 on sub-diagram $G_1$. Denote the resulting allocation $\hat{x}_1=(\hat{x}_k, k\in G_1)$. Then, under allocation $\hat{x}$, the required input rate at the node 1 is $\hat{\alpha}_P^1=\hat{x}_1\alpha_P^1$, from its parent nodes P∈$I^1$; in addition, since $\hat{x}_N=1$, the tail node N produces output at rate $\hat{\beta}_Q^N=\hat{x}_N\hat{\beta}_Q^N=\hat{\beta}_Q^N$ to its child nodes Q∈$O^N$.

Next, a supernode S (see the right plot in FIG. 5 is defined). Given a unit of computing resource, node S requires inputs at rates $$\tilde{\alpha}_P^S := \frac{\tilde{\alpha}_P^1}{\hat{x}_S},$$

for P∈$I^1$, and produces output at rates $$\tilde{\beta}_Q^S := \frac{\hat{\beta}_Q^N}{\hat{c}_S}, \text{ for } Q \in O^N,$$

where $\hat{x}_S:=\Sigma_{k\in G_1}\hat{x}_k$.

By replacing sub-diagram $G_1$ (in the original diagram G) by supernode S, a new diagram $\tilde{G}=(\tilde{N}, \tilde{E})$, where $\tilde{N}=\{S\}\cup N_2$, and $\tilde{\beta}_S^P=\beta_1^P$ for all P∈$I^1$ is obtained.

The original linear programming (LP) problem for diagram G is equivalent to the (LP) for the new diagram $\tilde{G}=\{S\}\cup G_2$. If $(\tilde{x}_S,\tilde{x}_2)$ is the optimal solution of the (LP) on the new diagram $\tilde{G}$, then $$x := \left(\tilde{x}_S\frac{\hat{x}_1}{\hat{x}_S}, \tilde{x}_2\right)$$

is optimal for the original (LP) on diagram G.

It suffices to show that from any optimal solution for the (LP) problem on diagram $\tilde{G}$, we can find a feasible solution x for the LP problem on diagram G that uses the same amount of capacity and has the same objective value. In addition, from any optimal solution for (LP) on diagram G, we can find a feasible solution for the (LP) problem on the diagram $\tilde{G}$, that uses the same amount of capacity and has the same objective value.

Similarly, the internal flow constraints on links (N,Q) for all Q∈$O^N$ can be verified. Therefore x must be feasible to the original (LP) on diagram G.

Therefore, the two approaches must be equivalent.

The following statement then is immediate. Any series-parallel sub-diagram $(G_1,s,t)$ in G can therefore be aggregated to an equivalent supernode following the aggregation procedure described above.

Single Link Partition

Figure 6:
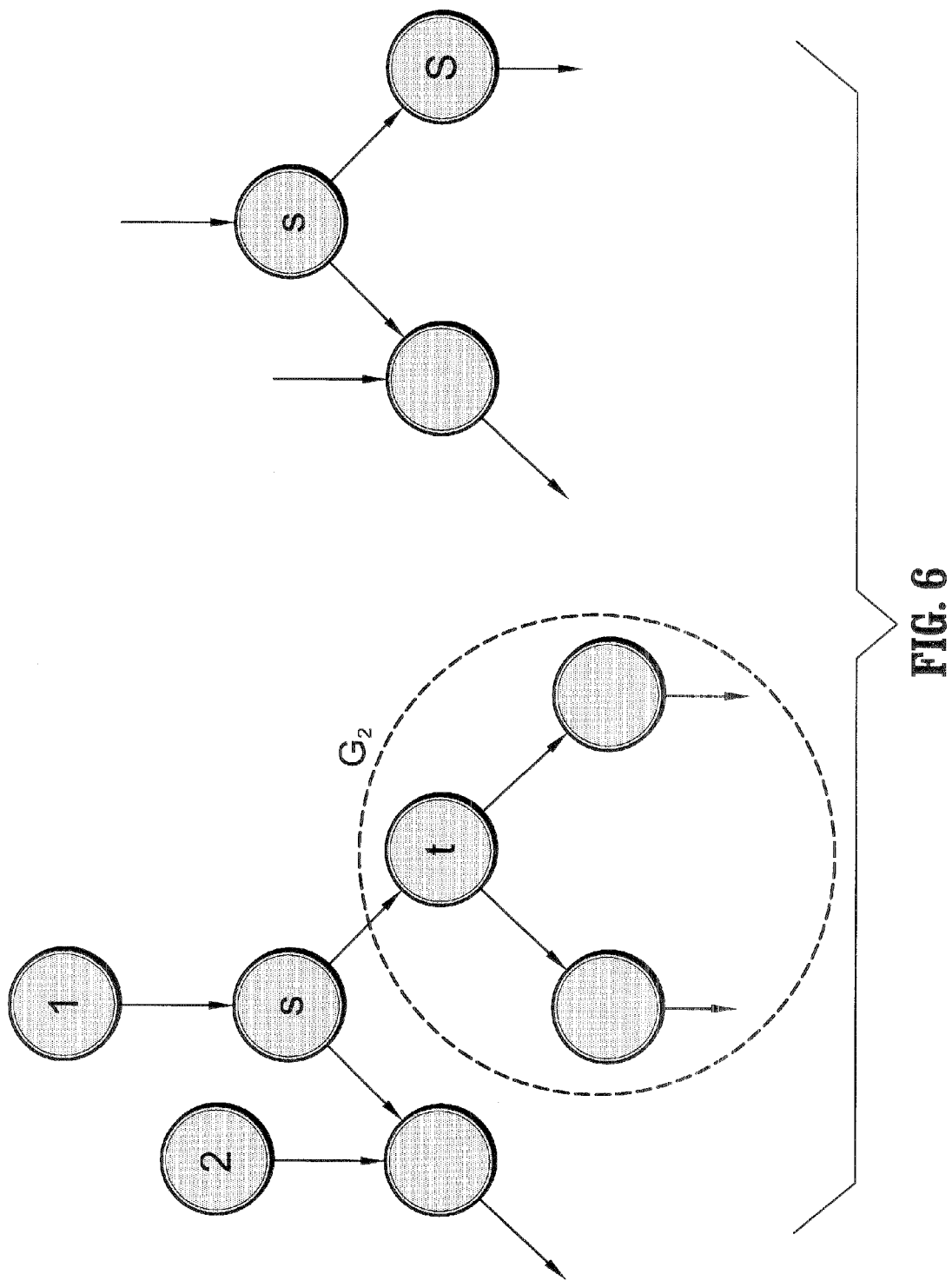
FIG. 6 is a representation of a single link partition and aggregation according to an exemplary embodiment of the present invention.

Suppose link l=(a,b) is one such that by cutting l, the original diagram G can be partitioned into two disjoint sub-diagrams $G_1$ and $G_2$, with a∈$G_1$ and b∈$G_2$. $(G_1,G_2)$ is termed a single link (a,b) partition for G, see, for example, FIG. 6. In the following, some basic properties of the optimal solution on such links are derived and a method that can aggregate sub-diagram $G_2$ into an equivalent supernode S is presented.

The following shows that if node b is active in the optimal solution, it then must fully utilize all the output flow produced by node a.

Suppose diagram G has a single link (a,b) partition $(G_1,G_2)$ with a,b∈P. There must be an optimal solution x* for the (LP) on diagram G such that either $x_b^*=0$ or $\alpha_a^b x_b^* = \beta_b^a x_a^*$.

Consider the special case when the diagram G is of the tree topology. That is, after changing all the directed edges to undirected edges, the resulting undirected diagram is a tree. In this case, any link in ϵ can produce a single link partition for G. The following statement is then immediate.

For the (LP) where the underlying diagram G is a tree, there must be an optimal solution x* such that for link (i,j) is in ϵ with i,j∈P, either $x_j^*=0$, or $\alpha_i^j x_j = \beta_j^i x_i$. That is, either node j is idle, or else it must fully utilize all the output flow from its parent node i. A procedure that aggregates the sub-diagram $G_2$ into an equivalent supernode S will now be described Aggregation Procedure 2: Single-Link Partitioned Graphs 1. First formulate (LP) for $G_2$ assuming a is the source node with the maximum input rate available to node b is 1, and there is no capacity constraint. Solve for the optimal solution $\hat{x}_2=(\hat{x}_j, j\in G_2)$. Suppose it produces benefit $V_2(\hat{x}_2)$. Denote $\hat{x}_S:=\Sigma_{j\in G_2}\hat{x}_j$.

2. Represent sub-diagram $G_2$ by a supernode S. With a unit of computing resource, node S requires input from node a at rate $$\tilde{\alpha}_a^S = \frac{1}{\hat{x}_S},$$

and produces a single output stream at rate $$\tilde{\beta}_O^S = \frac{V_2(\hat{x}_2)}{\hat{x}_S}.$$

Notice that when the network is of a tree structure, any link can produce a single link partition for G. One can therefore shrink any sub-tree into an equivalent supernode. The backward shrink algorithm described above is just doing this backward recursively.

A desired result is that the backward shrink algorithm for networks of a tree structure must produce an optimal solution to the original problem.

In general, the various aggregation rules presented above can be applied to the general cases of arbitrary network topology, and substantially reduce the size of the original problem for large scale systems. In particular, since the optimal resource allocation for the nodes inside a supernode is determined locally, subject to the total available resource to that supernode, all nodes in a sub-diagram can be considered as a cluster and the role of supernode can be played by an elected local leader. The leader can then represent the whole cluster and negotiate with other leaders. Such distributed and local management is also more robust especially when the system parameters are not static and subject to changes. Therefore, instead of requiring a centralized and global optimization, a distributed way of resource management is enabled, which is discussed in more detail below.

Distributed solutions for the problem in order to adapt to real-time fluctuations in the consumption and production rates and changes in resource consumption requirements are set forth below.

Two heuristics to solve the general problem are described herein. These heuristics are based on the optimal solutions for the tree case and for the single-output case. Experimental results illustrating the effectiveness of the methods are also presented. In the following, these heuristics can be implemented easily in a distributed way. The first heuristic is based on the optimal solution for trees. As assumed earlier, all the nodes have been labeled from 1 to N such that all the edges (i, j) satisfy i<j. This algorithm will start from the bottom of the diagram and move up to the top. At each step, the algorithm examines each node, generates aggregated information based on information from its children, and passes this information up to its parents.

---

Heuristics A
   initialize diagram G to be the whole diagram;
     for node = N to 1 (compute bottom up for the aggregated solution)
         if node is a leaf in G then pass its parameters $\alpha$, $\beta$, w to its parents;
         else
            all the children of node must be leaves in G;
            apply the procedure used in the operation described above in going from FIG. 2 to FIG. 3 repeatedly to remove one leaf at a time from G;
            apply the procedure used in the operation described above in going from FIG. 3 to FIG. 4 to obtain the updated parameters $\alpha$, $\beta$, w for the node;
            at this point, the node has no children left in G;
            pass updated parameters to all its parents;
        end
   at this point, G has only one node left, with all the aggregated parameters; solve this single node problem;
     for node = 1 to N (compute a solution for the original problem from top down)
      apply the above procedures to compute the solution for the node and the flow amount to all its children;
     end

---

If the original diagram is a tree, it can be shown that the above method obtains the optimal solution. For the general diagram case, experimental results are set forth to demonstrate the quality of this distributed method.

Another heuristic for the general problem with multiple output streams is developed based on the single output method combined with the general gradient descent method. Assume there are multiple output streams, $O_1, \ldots, O_k$. We define a function $f(u_1, \ldots, u_k)$ to be the best objective value if the solutions are generating flows for the output streams according to the relative proportion given by $(u_1, \ldots, u_k)$. Finding $f(u_1, \ldots, u_k)$ is the same as solving a modified problem with a new final sink node $O_{k+1}$, and making all the original output flows to flow into this final sink node. The $\beta$ parameters for all the flows from $O_1, \ldots, O_k$ to $O_{k+1}$ are all set to be 1. The $\alpha$ proportions at $O_{k+1}$ are given by $(u_1, \ldots, u_k)$ for flows from $O_1, \ldots, O_k$. The $\beta$ parameter at $O_{k+1}$ is $w_1 u_1 + \ldots + w_k u_k$. The weight factor w at $O_{k+1}$ is 1. The equivalence of these two problems can be easily checked. The backtrack method described above can be applied to find the optimal solution for the single output problem, thus, the value of $f(u_1, \ldots, u_k)$ for any given $(u_1, \ldots, u_k)$ can be found. The gradient descent method can be applied to find the maximum value for function $f(u_1, \ldots, u_k)$. The general procedure is given below:

Heuristics B
   0) initialize $(u_1, \ldots, u_k)$ to be $(w_1, \ldots, w_k)$;
   1) call the method for the single output problem described above with $(u_1, \ldots, u_k)$;
   2) estimate the gradient for $f(u_1, \ldots, u_k)$ by evaluating $f(u_1+\delta_1, \ldots, u_k), \ldots, f(u_1, \ldots, u_k+\delta_k)$;
   3) move point $(u_1, \ldots, u_k)$ along the gradient direction;
   4) repeat from step 1) until relative difference between two consecutive solutions is below a given threshold.

Note that in Heuristics B described above, the gradient method can be replaced by other search techniques such as simulated annealing, Tabu search, genetic algorithms, etc.

Heuristics A described above has the advantage that it can quickly generate high quality solutions for simple diagram topologies. When the diagram is complex, however, the quality may degrade. Heuristics B is provided to handle more effectively complex diagram structures. Experimental results to compare the performance of these two heuristics and the linear programming (LP) solution are set forth below.

The setting of the experiment is as follows. First, directed acyclic graphs with N nodes are generated randomly using the following 4 steps:

1). Randomly generate N points $x_i, y_i$ in the unit square $[0, 1] \times [0, 1]$;

2). For $i=1, \ldots, N$, generate its successor set $S_i := \{j : x_j \geq x_i, y_j \geq y_i\}$;

3) For $i=1, \ldots, N$, generate its immediate successor set $s_i := S_i - \cup_{k \in s_i} S_k$;

4) For $i=1, \ldots, N$, create a link from i to j if $j \in S_i$.

This method is inspired by a scheme to generate random partial orders among N elements. Once the diagram is generated, the parameters $\alpha$, $\beta$, w are then generated from independent uniform random samples. Diagrams with 20, 50, and 100 nodes are randomly generated. For each fixed number of nodes, 1000 instances of the problem with random topology and random parameter values are generated. The two above-described heuristics to obtain the corresponding objective values are applied. The LP solution using an LP solver is also obtained. The characteristics of the random diagrams are collected, as well as the quality of the two heuristics. Because the problem is a maximization problem, the quality of the heuristics is reflected by the achieved percentage of the optimal LP solution.

It has been observed that Heuristics B is consistently better than Heuristics A. It is also important that the average number of iterations is small. This means Heuristics B does not require too much additional time to compute compared with Heuristics A. It is encouraging to find that Heuristics B consistently generates quality solutions and, more importantly, its effectiveness can be improved through the use of more sophisticated search methods. It will be noted that the distributed nature and the efficiency of the methods are important, thus Heuristics B seems to be a preferable solution.

The ways to implement the resource allocation heuristics A and B in a distributed fashion are described below.

It is assumed in using the resource management model that initial, possibly rough, estimates of the consumption and production rates are available. Based on these estimates, the corresponding LP problem is solved and the processes are assigned to various physical servers with the appropriate CPU resource allocation. The CPU resource allocations can be adjusted/modified by individual processing units locally, and distributedly, through requests of resource release or resource increase submitted to the resource manager. The resource manager grants such requests while ensuring that the total resource usage for the system does not exceed its allocated capacity. In case a resource increase request cannot be satisfied locally, within the same physical server, the corresponding process can be migrated to another server through the help of the local resource manager. Due to its overhead, such process migration is to be avoided unless there is a significant gain in total return of the output streams. In the descriptions below, it is assumed that this rule is followed when resource allocation decisions are made, so that this issue will not be addressed explicitly.

The distributed versions of Heuristics A and B, both using measurement based distributed implementations are briefly described below.

Heuristic A (Distributed Version)
 Each node measures consumption and production rates;
 Leaf nodes pass their parameters a, $\beta$, w to parents;
 Any non-leaf node, upon receiving the parameters, apply operations used in going from FIG. 2 to FIG. 3 and the operations used in going from FIG. 3 to FIG. 4 to obtain the updated parameters $\alpha$, $\beta$, w for the node, and then pass the updated parameters to all its parents;
 The node without predecessors is allocated resource budget R;
 Any node, upon receiving resource budget, applies the operations used in going from FIG. 2 to FIG. 3 and the operation used in going from FIG. 3 to FIG. 4 to compute the solution itself and the resource budgets for its children, and sends the budget information to its children.

In Heuristics B, Step 1) calls the method used to solve the single output problem. That method can be implemented in a distributed way, analogous to the distributed implementation of Heuristics A. Such an implementation is referred to as a Distributed Algorithm or Method.

Heuristic B (Distributed Version)
 0) Each node measures consumption and production rates;
 1) Final Sink node sets $(u_1, \ldots, u_k)$ to be $(w_1, \ldots, w_k)$;
 2) Solve the single output problem for $(u_1, \ldots, u_k)$ with the Distributed Algorithm described above;
 3) Solve the single output problem for $(u_1+\delta_1, \ldots, u_k) \ldots (u_1, \ldots, u_k+\delta_k)$ with the Distributed Algorithm described above;
 4) Final Sink node estimate the gradient for $f(u_1, \ldots, u_k)$;
 5) Repeat Steps 1)-3) until the relative difference between the two consecutive solutions is below a given threshold.

As mentioned hereinabove, the stream processing environment (for example, flow properties and system parameters) can be dynamically changing. Furthermore, the stream processing systems can have non-stationary behaviors: the input streams can be non-stationary in the traffic patterns and/or in contents; and the stream consumption and production can be non-stationary due to the non-stationary contents. Therefore, the resource allocation solutions should adapt to the changes.

The distributed implementations of the Heuristics described above can easily handle such changes by local adaptation. In fact, each node will constantly (with, say fixed sampling frequency) measure the input rates, the consumption rates and the production rates.

If significant deviation occurs, which can be detected with some change-point detection techniques, the node will send the updated rate information to the parents. These parents will in turn forward the updated, aggregated parameters to their parents up to the top node which will readjust the resource allocation decisions and propagate downwards the resource allocation readjustments. To avoid abrupt changes in the resource allocation decisions, a smoothing step is added in both distributed methods, such that the actual resource allocated for each node is the moving average of its previous allocation and the current new assignment with a preselected smoothing factor.

It will be seen from Heuristic A that when a changing event occurs, it takes twice the depth of the diagram for the system to adjust to the new optimal solution. More specifically, a random tree structure with 355 nodes is generated where the depth equals 7. At time 0, a random subset of nodes are selected and the corresponding parameters are perturbed by ±20%. As time, it is assumed a unit time is the propagation delay for one hop, thus t time units means t hops away, proceeds, the performance of the perturbed system gradually converges and actually reaches the new optimal at time t=14 which is twice the depth of the tree. Here the smoothing factor $\gamma$=0.5. An average time that it takes for the perturbed system to reach 95% of the new optimal over 1000 random instances of the problem with 50, 100, 500 and 1000 nodes respectively, where the depth is fixed to be 7, varies from 4.1 to 7.1 seconds.

An exemplary embodiment of the present invention solves the CPU resource allocation problem in stream processing systems with the objective of maximizing the total return of multiple output streams. Structural properties of the optimal solution for the problem are described under different network topologies, and develop efficient, yet simple to implement methods, to solve them. Detailed performance analysis on optimality and complexity of those methods are also provided. Instead of requiring a centralized and global optimization, the present methods enable a distributed mechanism for resource management. Some general rules are presented that can aggregate all information of certain special sub-diagrams into equivalent supernodes. Although only specified aggregation rules for special types of network topology are described, the concept of supernodes can be extended to more general cases, where the analysis, however, will be much more involved.

Two distributed solutions to the general problem were presented above, and the corresponding measurement-based distributed implementations are given. Experimental results show that the methods described above are highly robust and capable of quickly adapting to real-time fluctuations in the consumption and production rates and changes in resource consumption requirements, while achieving high quality solutions even in non-stationary systems. It is also possible to extend the problem formulation to other variations, for example, by taking into account loss of dataflows, or by restricting to the case requiring no information loss.

In the following, the principles described above are presented in slightly different form using expanded diagrams.

Figure 7:
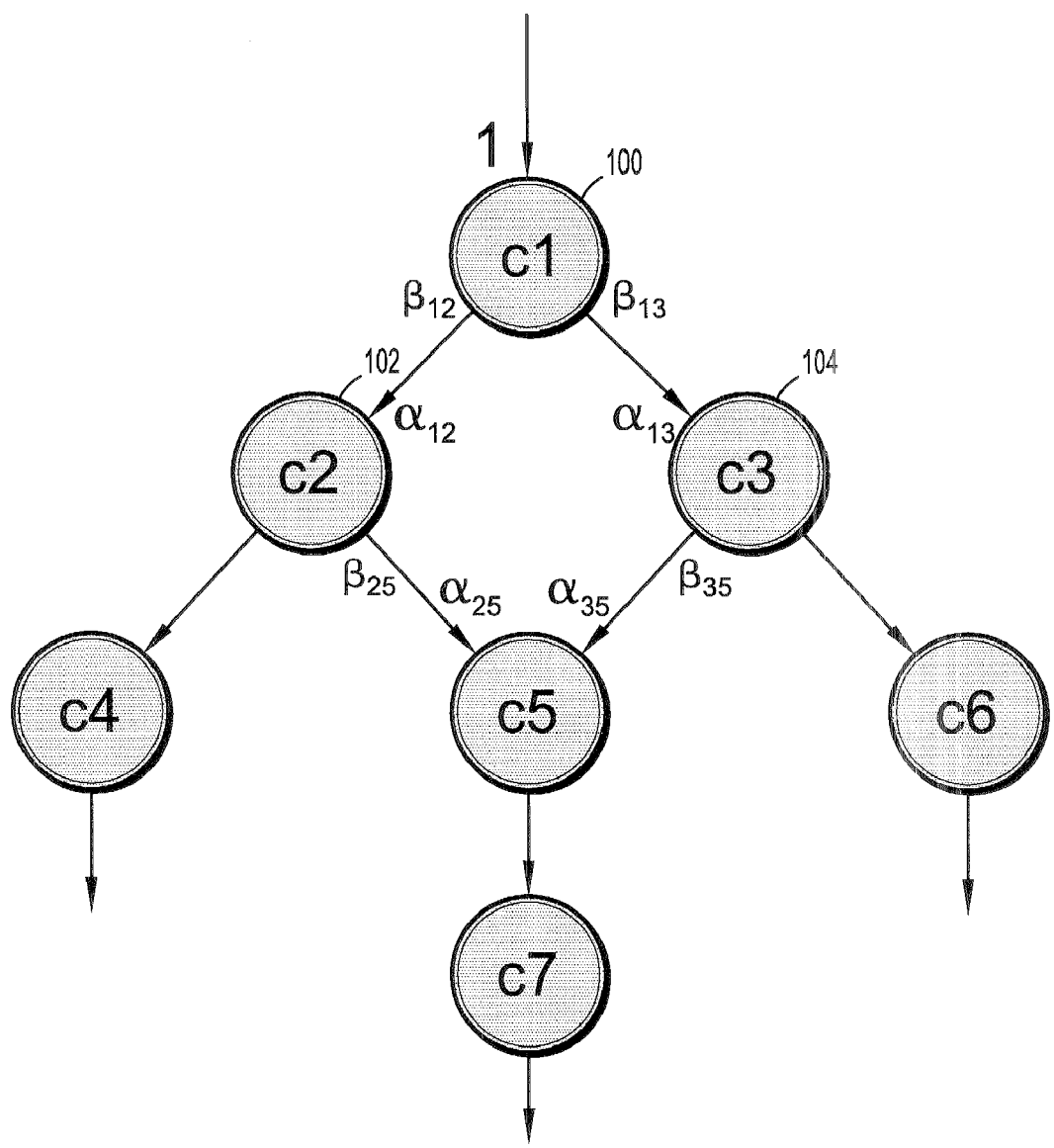
FIG. 7 is a representation of a stream processing system showing a directed task graph employing linear programming according to an exemplary embodiment of the present invention.

FIG. 7 shows a diagram of a stream processing system in the form of a directed diagram or task diagram. Each task needs a certain amount of resource to transform an input to an output. For example, in FIG. 7, node 100(C1) receives a one-unit input and produces $\beta_{12}$ to node 102(C2) and $\beta_{13}$ to node 104(C3). This costs C1 resource, which can be solved for by a linear program. In the diagram of FIG. 7, the flow-through node 106(C5) is balanced between its two inputs.

Figure 8:
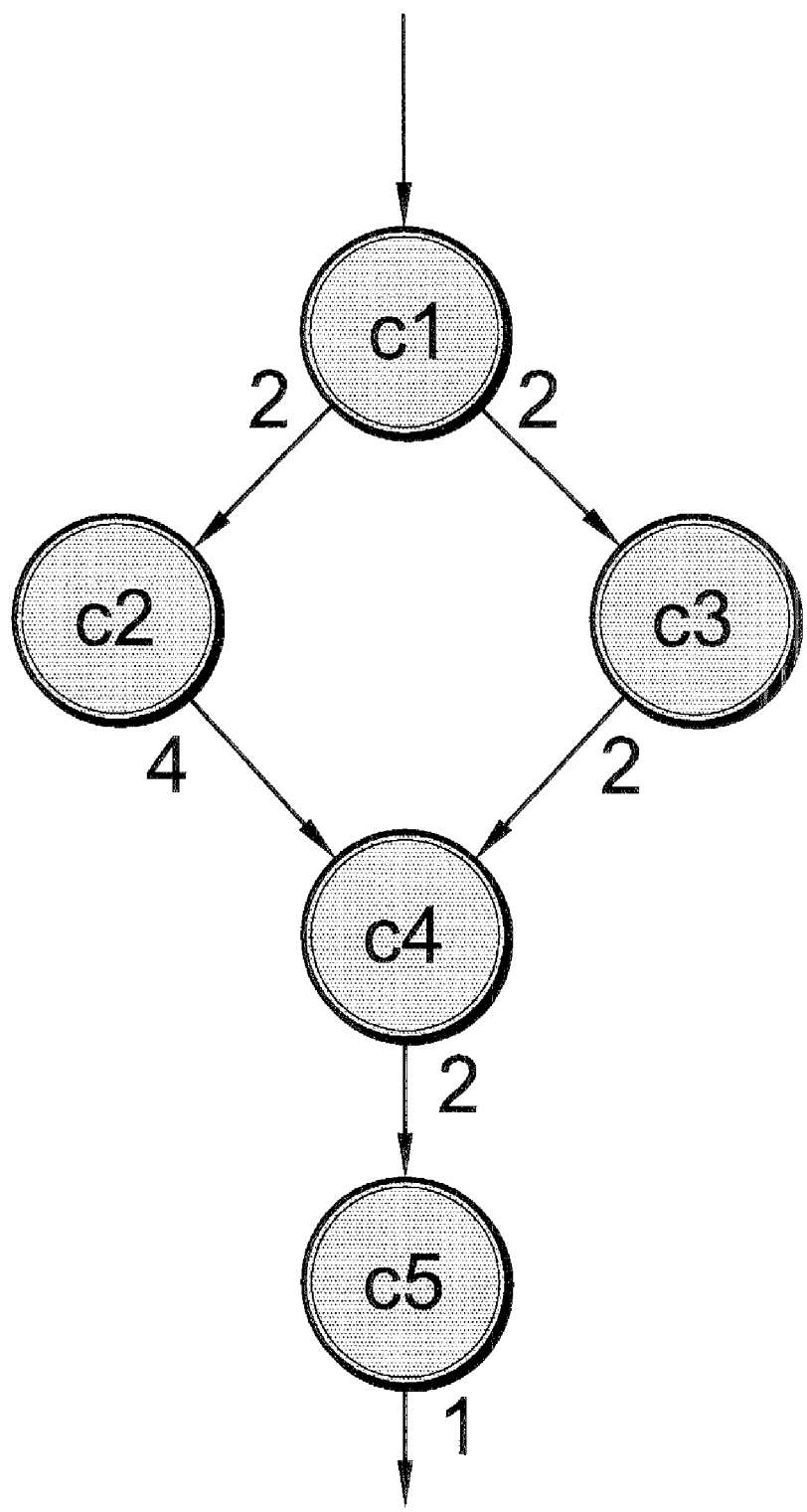
FIG. 8 is a representation of a stream processing system with a single output employing a backward algorithm according to an exemplary embodiment of the present invention.

FIG. 8 shows a single output case using a so-called backward algorithm in which it is first assumed to produce a unit output, and then the resource that is needed to be allocated for each task. Then the allocation is scaled to fully utilize the total available resource. The idea for this is: the algorithm terminates and yields an optimal solution. The complexity is of O(M), where M is the number of lings.

As an example of this system, it is assumed that all ci are 1 and C=16. To generate a 1 unit output, x5=1, x4=0.5, x3=0.25, x2=⅛, and x1=⅛. Scaling so that the sum is 16, we get x1=1, x2=1, x3=2, x4=4, and x5=8.

Figure 9:
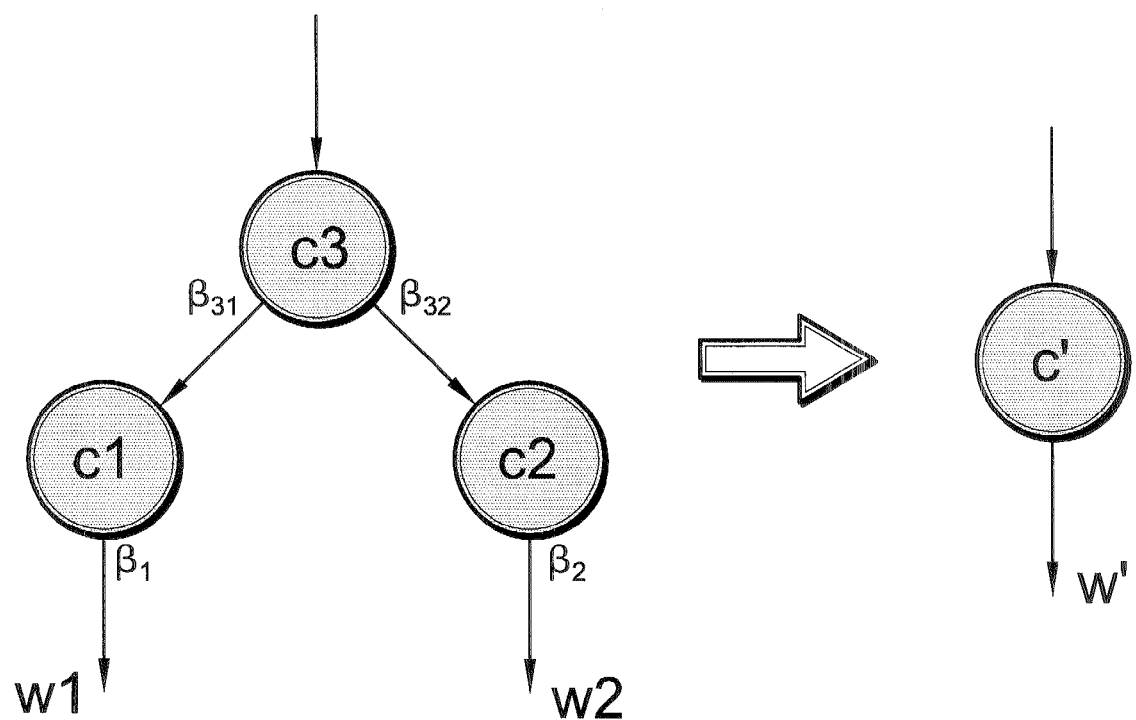
FIG. 9 is a representation of a stream processing system with multiple outputs employing a tree algorithm according to an exemplary embodiment of the present invention.

FIG. 9 shows a multiple output case of a tree. In such case, the solution scales linearly with the total resource C.

Figure 10:
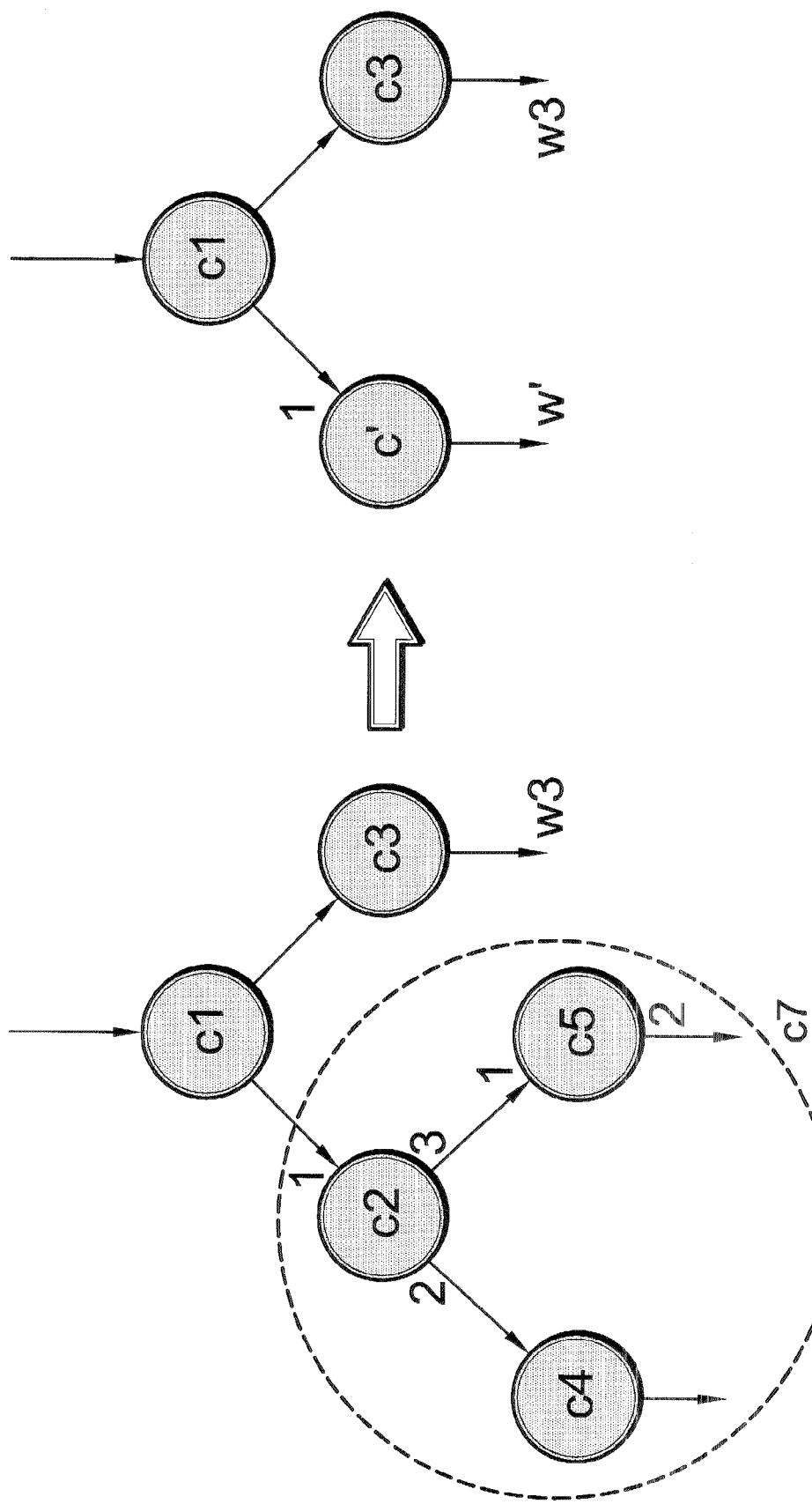
FIG. 10 is a representation of a stream processing system showing a general solution to a multiple output situation according to an exemplary embodiment of the present invention.

FIG. 10 also shows a multiple output case of a tree. FIG. 10 represents that the global optimum solution is also optimal for all local sub-trees.

In FIG. 10, each elementary unit of the tree is easy to solve. There are only three cases here for the sub-tree shown in the left figure of FIG. 10. By recursively performing the process, the whole problem is solved. The complexity is O(N), where N is the number of total vertices. As seen from FIG. 10, that number is three.

Figure 11:
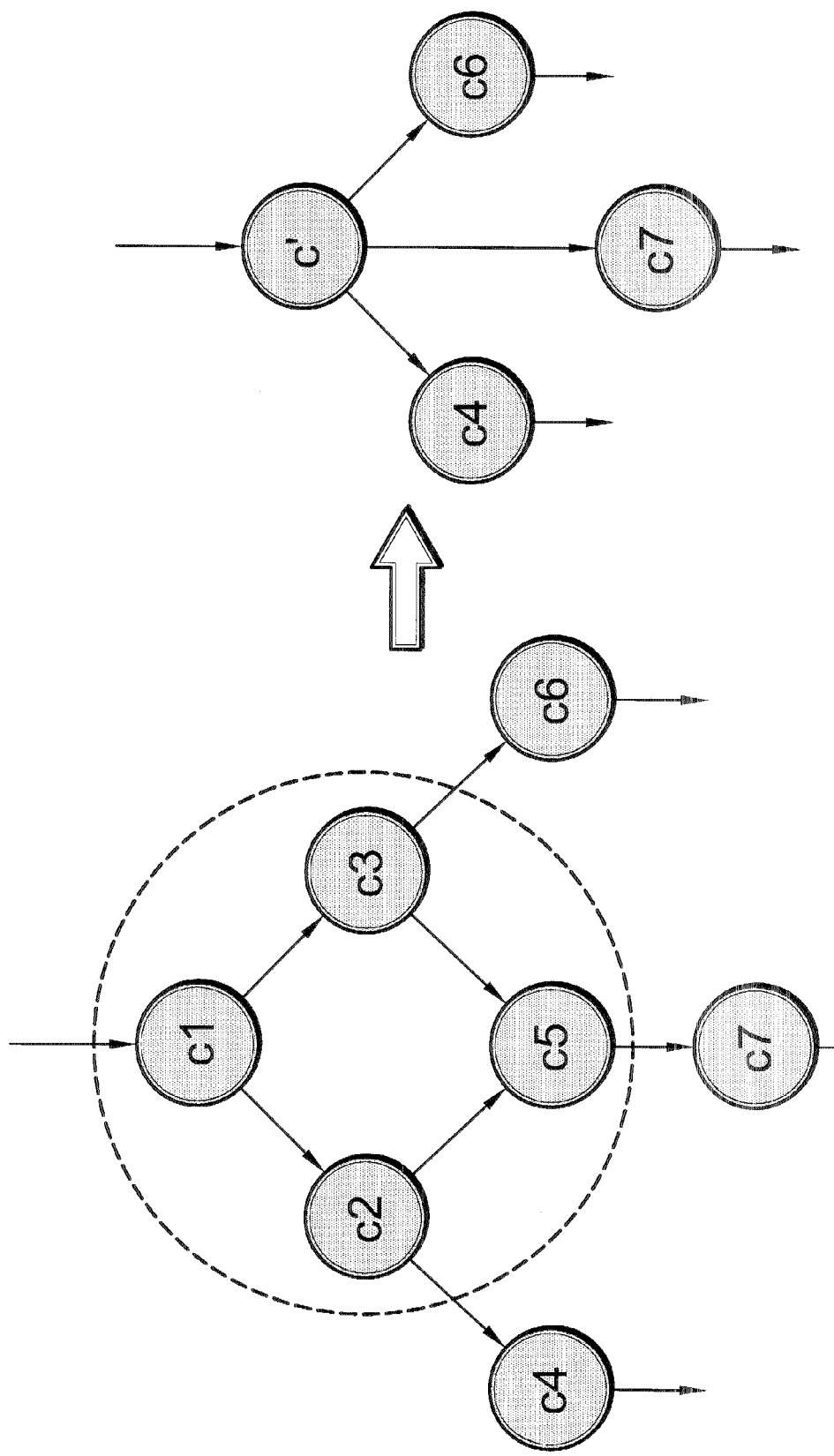
FIG. 11 is a representation of a stream processing system with a general multiple output case according to an exemplary embodiment of the present invention.

FIG. 11 shows a general multiple output case. In the method related to FIG. 11, at optimality the data flows in links in the sub-diagram are either fully used or not used at all. As seen from FIG. 11, by reducing a strongly connected component, shown enclosed by the circle, to a supernode, the general directed diagram is reduced to a sub-diagram, which is a tree.

Figure 12:
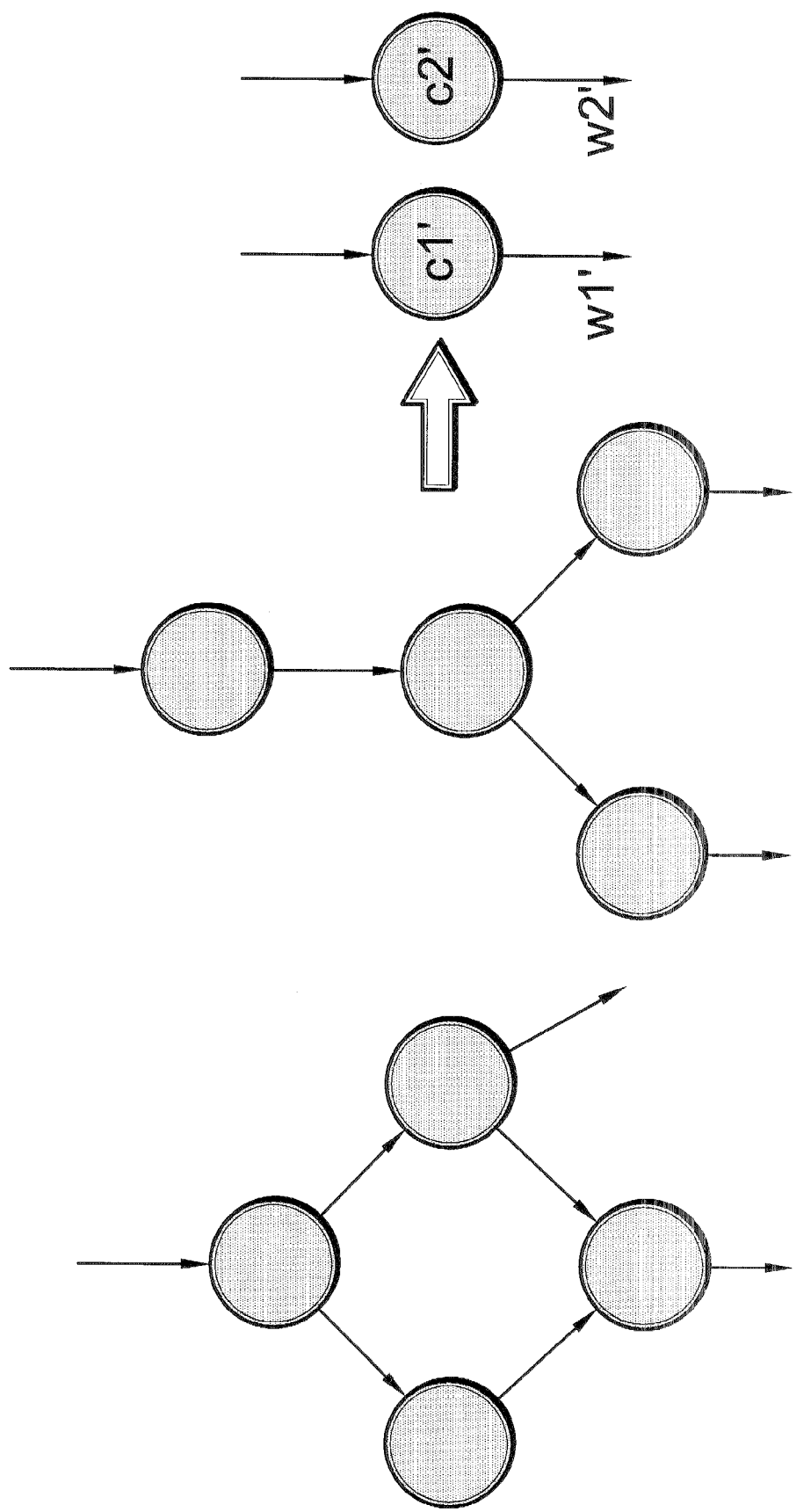
FIG. 12 is a representation of a stream processing system showing a multiple output situation in a disconnected graph case according to an exemplary embodiment of the present invention.

FIG. 12 shows a disconnected diagram case where each of the two diagrams shown on the left is reduced to a respective sub-diagram C1' and C2' shown on the right.

Figure 13:
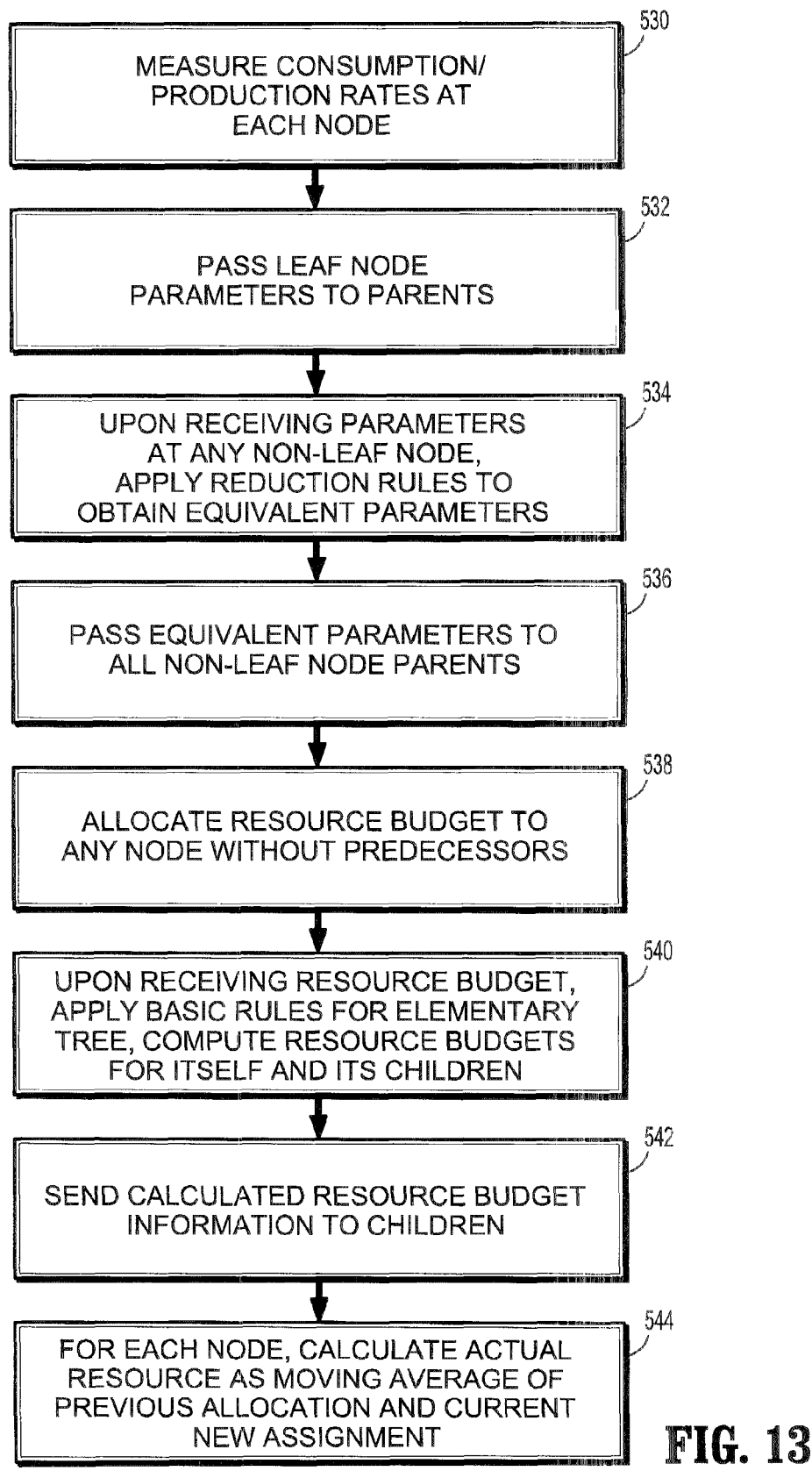
FIG. 13 is a representation of method steps to be performed in practicing a method for resource allocation according to an exemplary embodiment of the present invention.

FIG. 13 shows the steps to be performed in practicing a method according to an exemplary embodiment of the present invention. In step S30, each node measures the consumption and production rates and in step S32, the leaf nodes pass their parameters to their parents. In step S34, when any non-leaf node receives the parameters, the reduction rules are applied to obtain the equivalent parameters. Following applying the reduction rules, the updated parameters are then passed to all the parents of the non-leaf node, as shown in step S36.

A resource budget is allocated to any node without predecessors in step S38. Any node, upon receiving a resource budget, applies the basic rules for the elementary tree to compute the resource budgets for itself and for its children, as shown in step S40. The node then sends the resource budget information to its children, as shown in step S42.

Finally, for each node the actual resource that is allocated is actually the moving average of its previous allocation and the currently allocated new assignment, as shown in step S44.

Those skilled in the art of stream data processing will appreciate that a program storage device, readable by machine, can be provided which tangibly embodies a program of instructions executable by the machine to perform resource allocation for stream data processing formed of a plurality of nodes. The method would include measuring a consumption/production rate parameter at each node; transferring measured parameters to parent nodes; applying reduction rules to obtain equivalent parameters for any non-leaf node; allocating a resource budget to any node without predecessors; upon receiving a resource budget applying predetermined rules for an elementary tree of the data stream, computing a resource budget for the elementary tree and its children by calculating a moving average of a previous allocation and a current value of an allocation; and sending a calculated resource budget to all children.

It will be understood, of course, that the foregoing is presented by way of example only and is not intended to limit the present invention, which is defined by the appended claims.

The invention claimed is:

1. A method for resource allocation for a data stream processing system formed of a plurality of nodes, comprising:
    measuring a consumption/production rate parameter at each node;
    transferring measured parameters to parent nodes;
    applying reduction rules to obtain equivalent parameters for any non-leaf node;
    allocating a resource budget to any node without predecessors;
    upon receiving the resource budget, applying predetermined rules for an elementary tree of the data stream, computing a resource budget for the elementary tree and its children by calculating a moving average of a previous allocation and a current value of an allocation; and
    sending a calculated resource budget to all children,
    wherein the plurality of nodes comprise central processing units (CPUs) that process data to generate an output stream, and
    wherein computing the resource budget comprises determining an allocation of resources amongst the CPUs to maximize a weighted sum of throughputs of the output stream, each weight of a throughput being based upon an importance of the throughput of the output stream.

2. The method according to claim 1, further comprising the step of passing the obtained equivalent parameters to all non-leaf node parents.

3. A non-transitory program storage device readable by machine, tangibly embodying a program of instructions executable by the machine to perform resource allocation for a data stream processing system formed of a plurality of nodes, the program of instructions comprising:
    measuring a consumption/production rate parameter at each node;
    transferring measured parameters to parent nodes;
    applying reduction rules to obtain equivalent parameters for any non-leaf node;
    allocating a resource budget to any node without predecessors;
    upon receiving the resource budget, applying predetermined rules for an elementary tree of the data stream, computing a resource budget for the elementary tree and its children by calculating the resource budget as a moving average of a previous allocation and a current value of the allocation; and
    sending a calculated resource budget to all children,
    wherein the plurality of nodes comprise central processing units (CPUs) that process data to generate an output stream, and
    wherein computing the resource budget comprises determining an allocation of resources amongst the CPUs to maximize a weighted sum of throughputs of the output stream, each weight of a throughput being based upon an importance of the throughput of the output stream.

4. The program storage device of claim 3, further comprising passing the obtained equivalent parameters to all non-leaf node parents.

5. A method for allocating resources for a data stream processing system formed of a plurality of nodes, the method comprising:
- determining resource consumption/production rate parameters at each node;
- providing determined leaf node parameters to respective parent nodes;
- applying predetermined reduction rules to obtain equivalent parameters upon receiving the determined parameters at a respective non-leaf node;
- transmitting the obtained equivalent parameters to all non-leaf node parent nodes;
- allocating a predetermined resource budget to any node without predecessors;
- upon receiving the predetermined resource budget, applying predetermined rules for an elementary tree and calculating resource budgets for the node without predecessors and its children by calculating a moving average of a previous allocation and a current allocation;
- sending the calculated resource budget to the children,
- wherein the plurality of nodes comprise central processing units (CPUs) that process data to generate an output stream, and
- wherein calculating resource budgets comprises determining an allocation of resources amongst the CPUs to maximize a weighted sum of throughputs of the output stream, each weight of a throughput being based upon an importance of the throughput of the output stream.

6. The method of claim 5, wherein the CPUs reside on one or more physical servers.

7. The method of claim 6, wherein processes are assigned to various ones of the one or more physical servers and CPU resource allocations to individual CPUs are adjustable by the individual CPUs through requests of resource release or resource increase submitted to a resource manager.

8. The method of claim 7, wherein the resource manager can grant such requests provided that a total resource usage for the data stream processing system does not exceed its allocated capacity.

* * * * *